(12) United States Patent
Takahashi

(10) Patent No.: US 10,099,441 B2
(45) Date of Patent: Oct. 16, 2018

(54) TIRE VULCANIZATION MOLD AND METHOD FOR MANUFACTURING TIRE

(71) Applicant: Sumitomo Rubber Industries, Ltd., Kobe-shi, Hyogo (JP)

(72) Inventor: Shingo Takahashi, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 1049 days.

(21) Appl. No.: 13/895,528

(22) Filed: May 16, 2013

(65) Prior Publication Data

US 2013/0328240 A1   Dec. 12, 2013

(30) Foreign Application Priority Data

Jun. 8, 2012   (JP) .................................. 2012-131312

(51) Int. Cl.
*B60C 11/03* (2006.01)
*B29D 30/06* (2006.01)
(Continued)

(52) U.S. Cl.
CPC .......... *B29D 30/0601* (2013.01); *B29C 33/30* (2013.01); *B29C 33/424* (2013.01);
(Continued)

(58) Field of Classification Search
CPC .... B29D 2030/0607; B29D 2030/0612; B29D 2030/061; B29D 2030/0613; B29D 2030/0616; B29D 2030/0633; B60C 2011/1213; B60C 11/0304; B60C 2011/129; B60C 2011/1295; B60C 11/12
See application file for complete search history.

(56) References Cited

U.S. PATENT DOCUMENTS 5,198,047 A * 3/1993 Graas .................. B60C 11/0302
152/209.18
5,340,294 A * 8/1994 Kata ....................... B29C 33/10
264/219

(Continued)

FOREIGN PATENT DOCUMENTS

| JP | 2005-193867 A | | 7/2005 | |
|---|---|---|---|---|
| JP | 2007153056 | * | 6/2007 | |
| JP | WO 2012005187 A1 | * | 1/2012 | ......... B60C 11/0306 |

*Primary Examiner* — Jeffrey M Wollschlager
*Assistant Examiner* — Armand Melendez
(74) *Attorney, Agent, or Firm* — Birch, Stewart, Kolasch & Birch LLP

(57) ABSTRACT

A tire vulcanization mold comprises a ring shaped tread mold which comprises a plurality of segments, each segment with a radially inner face and a pair of end faces each of which extends from a circumferential end of the inner face toward radially outwardly of the tire, the segments arranged in a circumferential direction of the tire to have a substantially continuous tread molding face by connecting inner faces one another, each inner face of segments comprising a circumferentially extending rib, a laterally extending rib, and blades for molding sipes, the blades including three dimensional blades which comprises a first blade with a thickness not more than 0.3 mm and a second blade with a thickness of from 0.4 to 0.6 mm arranged in one of the circumferentially end regions.

4 Claims, 10 Drawing Sheets

(51) Int. Cl.
  *B60C 11/12* (2006.01)
  *B29C 33/30* (2006.01)
  *B29C 33/42* (2006.01)

(52) U.S. Cl.
  CPC .......... *B29D 30/06* (2013.01); *B60C 11/0304* (2013.01); *B60C 11/0306* (2013.01); *B60C 11/1218* (2013.01); *B29D 2030/0612* (2013.01); *B29D 2030/0613* (2013.01); *B60C 2011/0346* (2013.01); *B60C 2011/1213* (2013.01)

(56) References Cited

U.S. PATENT DOCUMENTS

| | | | |
|---|---|---|---|
| 9,278,583 B2* | 3/2016 | Murata | B60C 11/0306 |
| 2002/0139460 A1* | 10/2002 | Boiocchi | B60C 11/0302 |
| | | | 152/209.2 |
| 2005/0150581 A1 | 7/2005 | Kishida | |
| 2008/0135149 A1* | 6/2008 | Sakamaki | B60C 11/12 |
| | | | 152/209.18 |
| 2009/0151833 A1* | 6/2009 | Sakai | B29D 30/0606 |
| | | | 152/209.25 |

\* cited by examiner

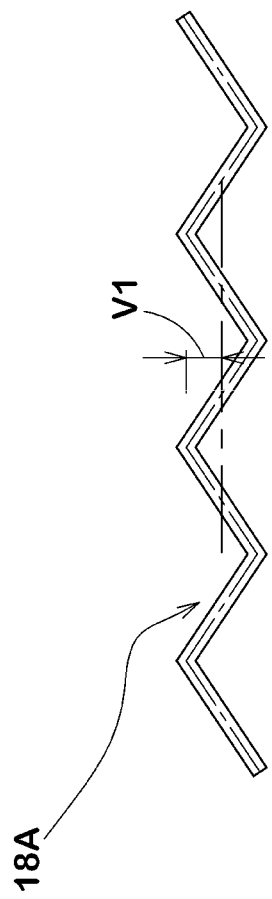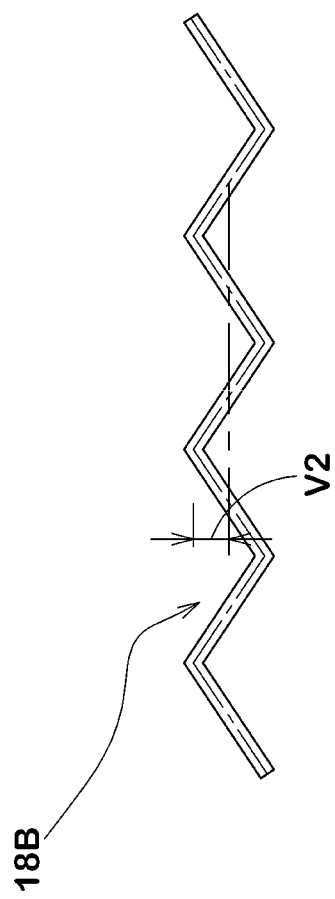
FIG.9A
FIG.9B

TIRE VULCANIZATION MOLD AND METHOD FOR MANUFACTURING TIRE

BACKGROUND OF THE INVENTION

Field of the Invention

The present invention relates to a tire vulcanization mold and method for manufacturing tire, more particularly to a tire vulcanization mold with improved high durability blades for molding sipes to a tread portion of a tire to be molded.

Description of the Related Art

Typically, a winter tire designed for use on ice and snow has a tread portion provided with a plurality of thin sipes in order to improve friction force against icy or snowy road by increasing biting edges of sipes. Each sipes of the tread portion is formed using a thin metallic blade of a tire vulcanization mold during tire vulcanized process.

In order to further increase the friction force of the tire tread surface on icy road, it may be important to increase a ground contact area of the tread surface. From this point of view, each blade preferably has a thickness as thin as possible.

Since a thin blade for molding sipe, however, has low bending rigidity, the blade is subject to damage such as a bend, or falling out from the tire vulcanization mold when removing the tire from the mold after the tire vulcanization process. In addition, the tire vulcanization mold typically comprises a plurality of segments that can individually move radially outwardly of the tire for releasing the tire from the mold. Thus, the blade arranged in a circumferentially end region of each segment is subject to a large bending moment from the tread rubber of the tire, when the segment moves radially outwardly of the tire, thereby the blade above is liable to damage.

SUMMARY OF THE INVENTION

The present invention has been made in light of such circumferences. A main object of the present invention is to provide a tire vulcanization mold with improved high durability blades for molding sipes to a tread portion of a tire to be molded.

According to one aspect of the present invention, there is provided a tire vulcanization mold comprising a ring shaped tread mold for molding a tread pattern of a tire to be molded, said ring shaped tread mold comprising a plurality of segments, said each segment having a radially inner face and a pair of end faces each of which extends from a circumferential end of the inner face toward radially outwardly of the tire, said segments being arranged in a circumferential direction of the tire so as to have a substantially continuous tread molding face by connecting inner faces one another, said each inner face of the segment comprising at least one circumferentially extending rib for molding a circumferential groove of the tread pattern, at least one laterally extending rib for molding a lateral groove of the tread pattern, and a plurality of blades for molding sipes of the tread pattern, said blades including a plurality of three dimensional blades which longitudinally extend in a zigzag manner, and said three dimensional blades comprising at least one first blade having a thickness in a range of from not more than 0.3 mm and at least one second blade having a thickness in a range of from 0.4 to 0.6 mm, the second blade being arranged at least one of circumferentially end regions of the inner face of the segment.

Preferably, the three dimensional blades comprise a plurality of second blades, and at least one second blade is arranged in both circumferentially end regions of the inner face of the segment.

Preferably, the three dimensional blades comprise a primary portion and a secondary portion disposed radially inwardly or outwardly of the primary portion, the primary portion comprises a plurality of adjacent parallelogram elements which are connected in a first zigzag manner in the longitudinal direction of the blade, the secondary portion comprises a plurality of adjacent parallelogram elements which are connected in a second zigzag manner in the longitudinal direction of the blade which differs from the first zigzag manner, and a zigzag amplitude of the first zigzag manner is the same as a zigzag amplitude of the second zigzag manner.

Preferably, the tread pattern has a designated install direction to a vehicle so as to have an outboard tread edge and an inboard tread edge, said at least circumferentially extending rib comprises an inboard circumferential rib arranged the nearest of the inboard tread edge and an outboard circumferential rib arranged the nearest of the outboard tread edge, said inboard circumferential rib and the outboard circumferential rib are non-symmetrically arranged with respect to a tire equator, said substantially continuous tread molding face includes an inboard shoulder region which is an axially outside region than the inboard circumferential rib and an outboard shoulder region which is an axially outside region than the outboard circumferential rib, said each circumferentially end of the inner face of the segment traverses between the laterally extending rib and the blade in the inboard shoulder region, said each circumferentially end of the inner face of the segment traverses between the blades in the outboard shoulder region, and the number of blades in the inboard shoulder region is larger than the number of blades in the outboard shoulder region.

According to another aspect of the present invention, there is provided a method for manufacturing a tire comprising a step of vulcanizing of a tire using the tire vulcanization mold defined above.

BRIEF DESCRIPTION OF THE DRAWINGS

FIG. 9A is a cross sectional view of the blade taken along a line A-A of FIG. 7, and FIG. 9B is a cross sectional view of the blade taken along a line B-B of FIG. 7.

DESCRIPTION OF THE PREFERRED EMBODIMENTS

One embodiment of the present invention will be described below with reference to the drawings.

Figure 1:
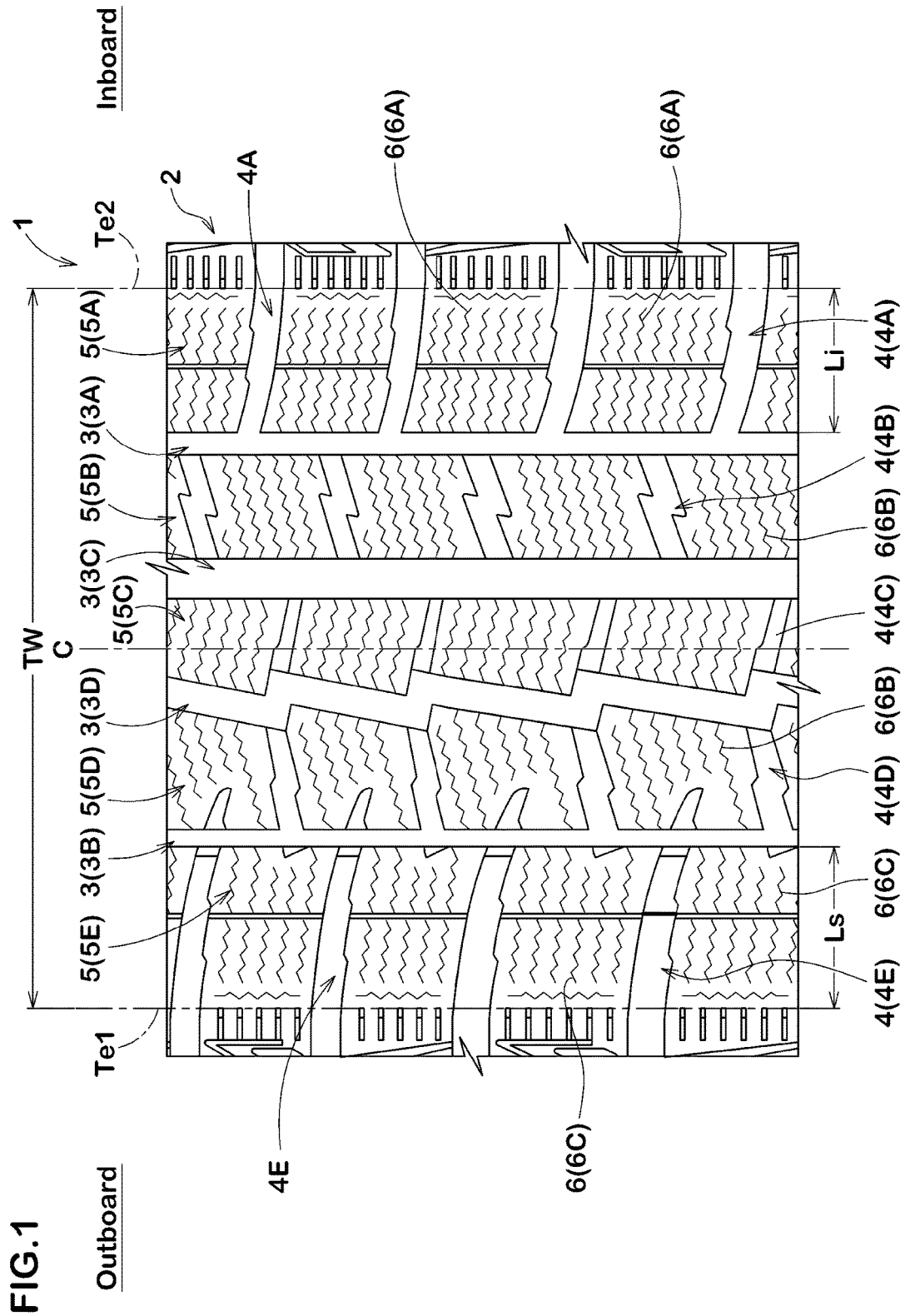
FIG. 1 is a development view of a tread portion of a tire manufactured using a tire vulcanization mold of the present embodiment of the invention.

FIG. 1 is a development view of a tread portion 2 of a tire 1 manufactured using a tire vulcanization mold of the present embodiment of the invention. Referring to FIG. 1, the tire 1 has the tread portion 2 with a tread pattern having a previously designated install direction to a vehicle so as to have an outboard tread edge Te1 and an inboard tread edge Te2. The designated install direction is, for example, identified using characters or a mark on a sidewall portion (not shown) of the tire. In this embodiment, the tire 1 is illustrated as a studless tire for passenger vehicles.

The inboard tread edge Te2 refers to one of the two tread edges which is intended to be positioned towards the center of the vehicle body. The outboard tread edge Te1 refers to the other tread edge which is intended to be positioned away from the center of the vehicle body. According thereto, in this application, the terms "outboard" and "inboard" are used toward the outboard tread edge Te1 and inboard tread edge Te2, respectively, to refer relative positions in the tire axial direction.

The tread portion 2 is provided with a plurality of circumferentially and continuously extending grooves 3 that include an inboard main groove 3A arranged the nearest of the inboard tread edge Te2, an outboard main groove 3B arranged the nearest of the outboard tread edge Te1, an inner main groove 3C arranged between the inboard main groove 3A and a tire equator C, and an outer main groove 3D arranged between the tire equator C and the outboard main groove 3B. The circumferentially grooves 3 are not particularly limited in the arrangement above, the grooves 3 may include three to six main grooves.

The tread portion 2 is provided with a plurality of lateral grooves 4 that extend while crossing with respect to the circumferential direction of the tire. In this embodiment, the lateral grooves 4 include a plurality of inboard lateral grooves 4A which extend from the inboard main groove 3A toward axially outwardly beyond the inboard tread edge Te2, a plurality of inner lateral grooves 4B which extend between the inboard main groove 3A and the inner main groove 3C, a plurality of center lateral grooves 4C which extend between the inner main groove 3C and the outer main groove 3D, a plurality of outer lateral grooves 4D which extend between the outer main groove 3D and the outboard main groove 3B, and a plurality of outboard lateral grooves 4E which extend from the outboard main groove 3B toward axially outwardly beyond the outboard tread edge Te1.

The tread portion 2 comprises a plurality of block rows 5 that include an inboard shoulder row 5A divided among the inboard tread edge Te2, the inboard main groove 3A and the inboard lateral grooves 4A, an inboard middle row 5B divided among the inboard main groove 3A, the inner main groove 3C and the inner lateral grooves 4B, a center row 5C divided among the inner main groove 3C the outer main groove 3D and the center lateral grooves 4C, an outboard middle row 5D divided among the outer main groove 3D, the outboard main groove 3B and the outer lateral grooves 4D, and an outboard shoulder row 5E divided among the outboard main groove 3B, the outboard tread edge Te1 and the outboard lateral grooves 4E. Each of block rows 5A to 5E is provided with a plurality of sipes 6 which extend in the axial direction of the tire.

Here, the tread edges Te1, Te2 are the axial outermost edges of the ground contacting patch which occurs under a normally inflated loaded condition when the camber angle of the tire is zero.

The normally inflated loaded condition is such that the tire is mounted on a standard wheel rim and inflated to a standard pressure and loaded with a standard tire load.

The standard wheel rim is a wheel rim officially approved or recommended for the tire by standards organizations, i.e. JATMA (Japan and Asia), T&RA (North America), ETRTO (Europe) and the like which are effective in the area where the tire is manufactured, sold or used. For example, the standard wheel rim is the "standard rim" specified in JATMA, the "Measuring Rim" in ETRTO, and the "Design Rim" in TRA or the like.

The standard pressure and the standard tire load are the maximum air pressure and the maximum tire load for the tire specified by the same organization in the Air-pressure/Maximum-load Table or similar list.

The standard pressure is the "maximum air pressure" in JATMA, the "Inflation Pressure" in ETRTO, and the maximum pressure given in the "Tire Load Limits at Various Cold Inflation Pressures" table in TRA or the like.

The standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

In this application including specification and claims, various dimensions, positions and the like of the tire refer to those under a normally inflated unloaded condition of the tire unless otherwise noted. The normally inflated unloaded condition is such that the tire is mounted on the standard wheel rim and is inflate d to the standard pressure but loaded with no tire load.

The tread width TW is the width measured under the normally inflated unloaded condition, as the axial distance between the tread edges Te1 and Te2 determined as above.

The inboard shoulder main groove 3A, the outboard shoulder main groove 3B and the inner main groove 3C are straight grooves extending along the circumferential direction of the tire. Thus, snow road performance may be improved by offering smoothly removing snow from main grooves 3A, 3B, 3C to backwardly. The outer main groove 3D extends in a zigzag manner in the circumferential direction of the tire. Such an outer main groove 3D may improve traction and braking force on snowy road, due to zigzag edges and high shearing force that is obtained by sharing snow pillar compressed in the outer main groove 3D. The inboard main groove 3A and the outboard shoulder groove 3B are non-symmetrically arranged with respect to the tire equator C. In this embodiment, the outboard shoulder row 5E has the axial width Ls larger than the axial width Li of inboard shoulder row 5A in order to improve steering stability of the tire.

Each of lateral grooves 4A to 4E inclines at angle with respect to the axial direction of the tire. Each of lateral grooves 4A to 4E inclines in opposite direction each other in order to offer edges of these grooves arranged in well balanced, whereby improves cornering performance on icy road. Preferably, each lateral groove 4A to 4E includes at least one groove edge that contains at least one zigzag part in order to further improve cornering performance on icy road of the tire.

The sipes 6 extend in a zigzag manner in order to offer biting edges arranged in well balanced, whereby further improves cornering performance on icy road. In this embodiment, the sipes 6 include: a semi-opened sipe 6A that has one end opened at one of the main grooves 3 and the other end terminating within the block; a full-opened sipe 6B that has both ends opened at main grooves 3; and a closed sipe 6C that has both ends terminating within the block.

Figure 2:
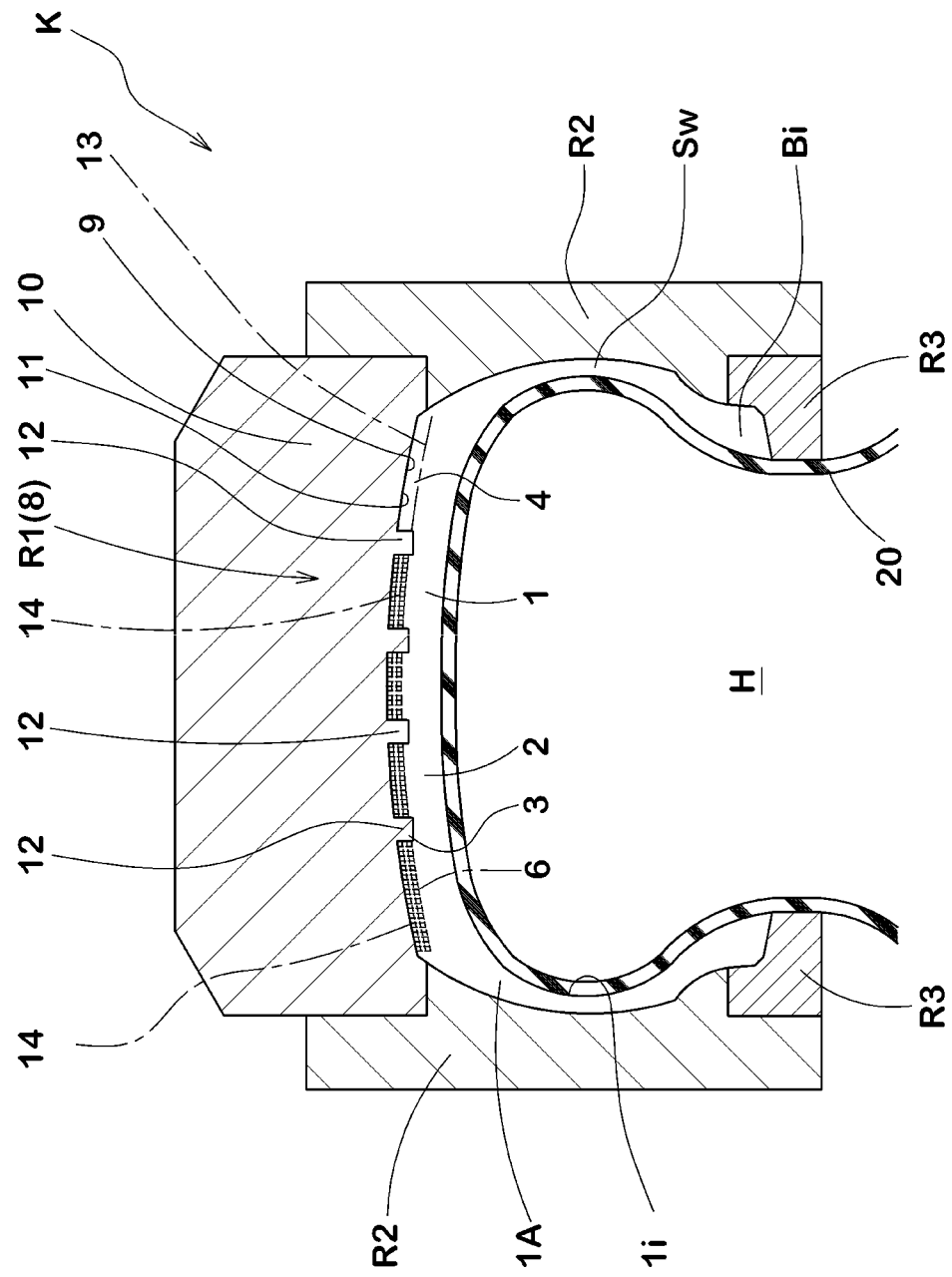
FIG. 2 is a cross sectional view of the tire vulcanization mold showing an embodiment of the present invention.

FIG. 2 shows a cross sectional view of the tire vulcanization mold K showing an embodiment of the present invention. Referring to FIG. 2, the tire vulcanization mold K comprises a ring shaped tread mold R1 for molding the tread pattern of the tire 1, a pair of sidewall molds R2 for molding the sidewall portions Sw of the tire 1, and a pair of bead molds R3 for molding the bead portions Bi of the tire 1.

Figure 3:
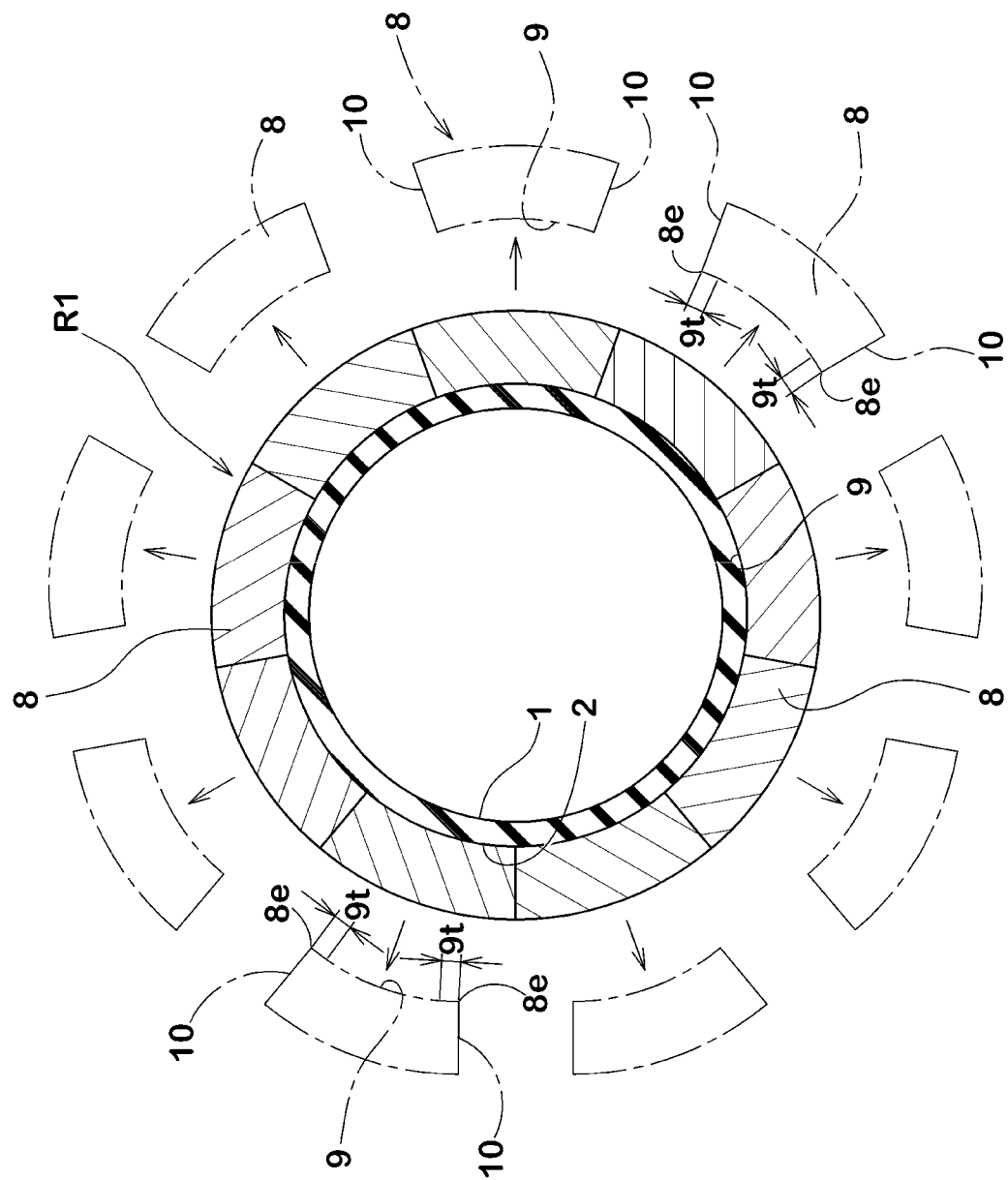
FIG. 3 is a circumferentially cross sectional view of a ring shaped tread mold showing an embodiment of the present invention.

FIG. 3 shows a circumferentially cross sectional view of the ring shaped tread mold R1 showing an embodiment of the present invention. Referring to FIG. 3, the ring shaped tread mold R1 comprising a plurality of segments 8 being arranged continuously in a circumferential direction of the tire. In this embodiment, nine segments are employed. Each segment 8 is movably provided radially outwardly of the tire so that the molded tire 1 is able to be released from the internal cavity H of the mold K.

Each segment 8 comprises a radially inner face 9 for molding the tread pattern, and a pair of end faces 10 each of which extends from a circumferential end 9e of the inner face 9 toward radially outwardly of the tire. Each segment 8 is arranged in the circumferential direction of the tire to have a continuous tread molding face by connecting inner faces 9 one another.

Figure 4:
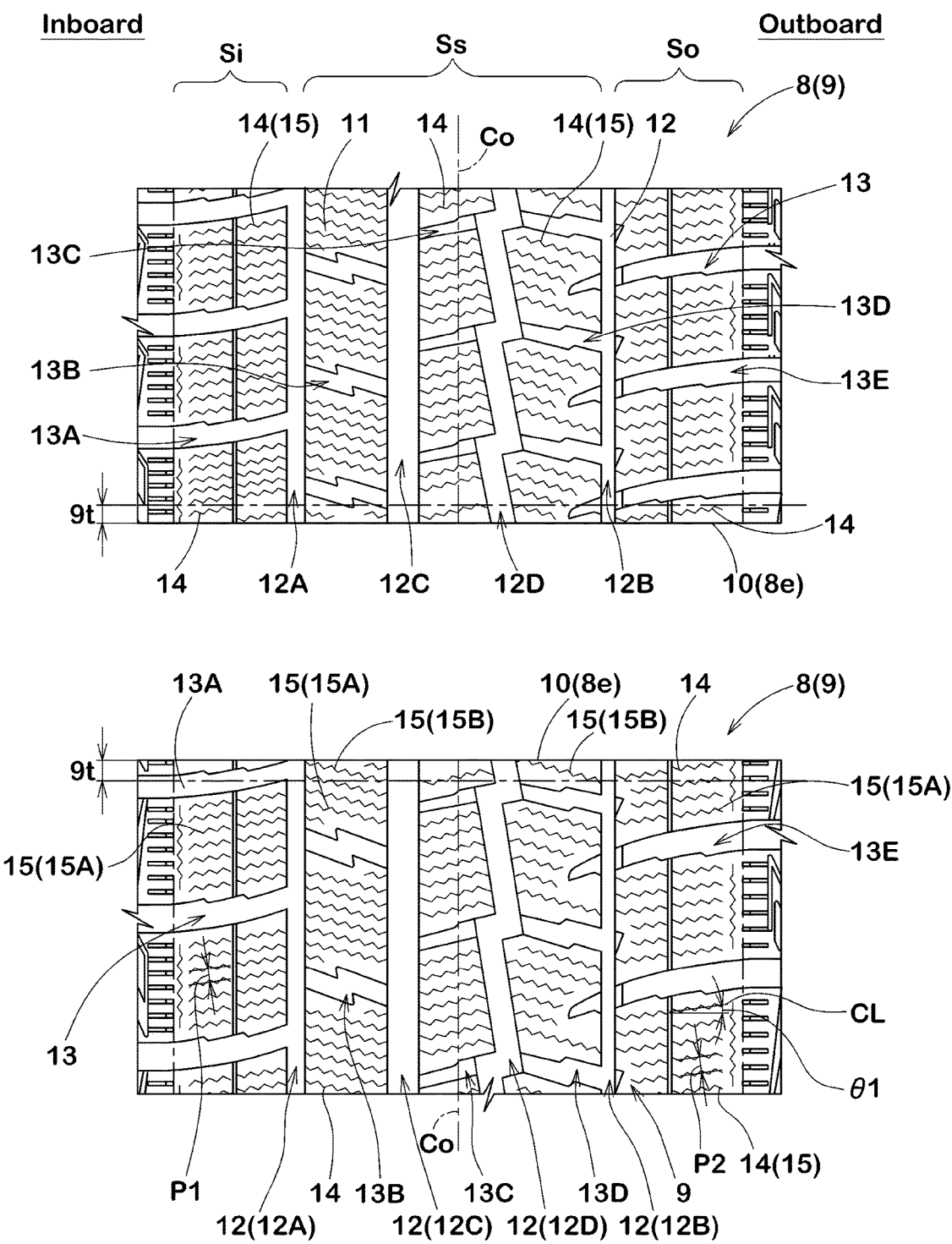
FIG. 4 is a development view of inner faces of segments showing an embodiment of the present invention.
Figure 5:
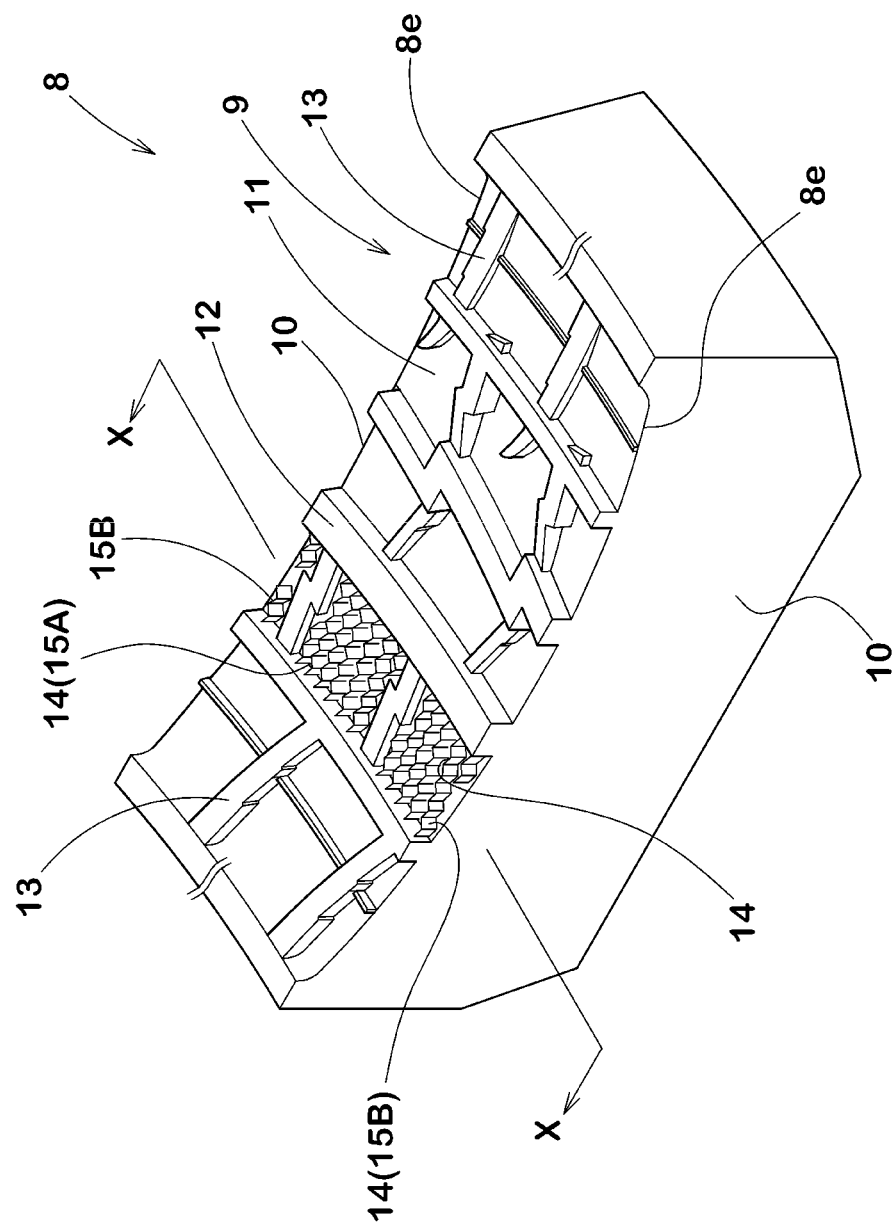
FIG. 5 is a perspective view of the segment.
Figure 6:
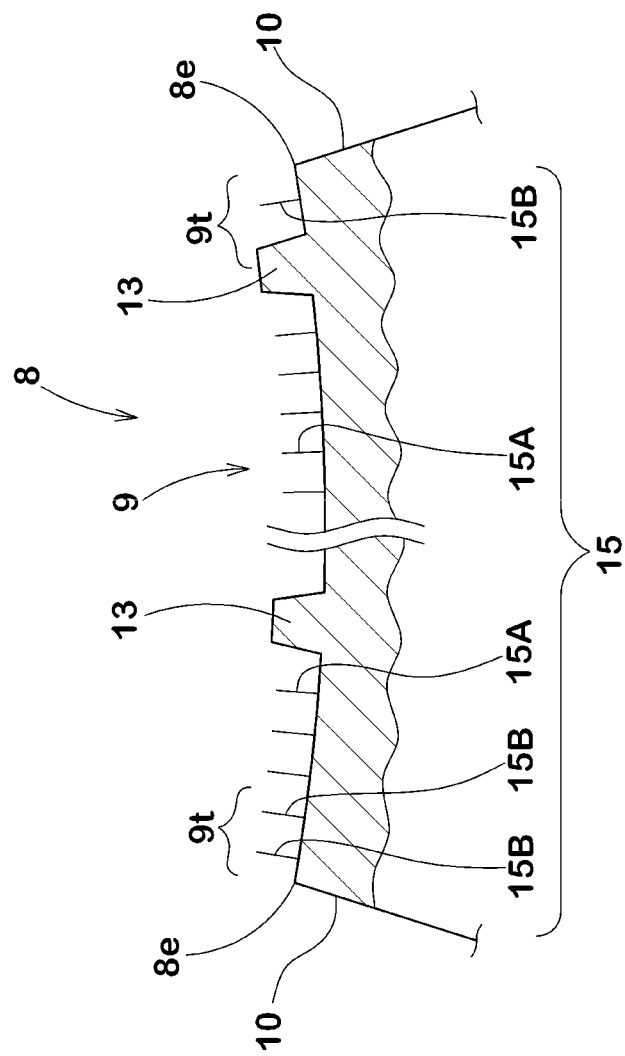
FIG. 6 is a cross sectional view taken along a line x-x of FIG. 5.

Referring to FIGS. 4 to 6, each inner face 9 of the segment 8 comprises a base face 11 for molding a ground contact face of the tread pattern, a plurality of circumferentially extending ribs 12 for molding main grooves 3 of the tread pattern, a plurality of laterally extending ribs 13 for molding lateral grooves 4 of the tread pattern, and a plurality of blades 14 for molding sipes 6 of the tread pattern.

FIG. 4 is a development view of inner faces 9 of adjoining two segments 9 showing an embodiment of the present invention. The circumferentially extending ribs 12 include an inboard circumferential rib 12A for molding the inboard main groove 3A, an outboard circumferential rib 12B for molding the outboard main groove 3B, an inner circumferential rib 12C for molding the inner main groove 3C, and an outer circumferential rib 12D for molding the outer main groove 3D. Thus, the inboard circumferential rib 12A and the outboard circumferential rib 12B are non-symmetrically arranged with respect to the tire equator C. Additionally, the tread molding face includes an inboard shoulder region si which is an axially outside region than the inboard circumferential rib 12A, an outboard shoulder region "So" which is an axially outside region than the outboard circumferential rib 12B, and a center region Ss between the inboard circumferential rib 12A and outboard circumferential rib 12B.

The inboard shoulder region Si is provided with a plurality of inboard lateral ribs 13A for molding inboard lateral grooves 4A. The outboard shoulder region "So" is provided with a plurality of outboard lateral ribs 13E for molding outboard lateral grooves 4E. The center region Ss is provided with a plurality of inner lateral ribs 13B for molding inner lateral grooves 4B, a plurality of center lateral ribs 13C for molding the center lateral grooves 4C, and a plurality of outer lateral ribs 13D for molding outer lateral grooves 4D.

The blades 14 which is made of metallic material are provided in each of center region Ss, inboard shoulder region Si and outboard shoulder region "So", respectively. In this embodiment, the blades 14 include a plurality of three dimensional blades 15 each of which longitudinally extends in a zigzag manner while changing an inclination with respect to the radial di reaction of the tire. Since such a three dimensional blade 15 has high bending rigidity, the durability of the tire vulcanization mold may be improved. A sipe formed using the three dimensional blade 15 may also improve snowy and icy road performance by offering an engagement of two opposed sipe faces each other so that large deformation of the tread portion 2 is prevented.

Referring to FIGS. 4 to 6, three dimensional blades 15, in this embodiment, comprise at least one first blade 15A having a thickness in a range of from not more than 0.3 mm, and at least one second blade 15B having a thickness in a range of from 0.4 to 0.6 mm. The first blade molds a thinner sipe that may improve icy road performance by offering large ground contact area of the tread portion. The second blade 15B has bending rigidity larger than that of the first blade 15A. Thus, in order to prevent damage such as a bending of the blade or to falling off from the segment 8, the second blade 15B is preferably is arranged at least one of circumferentially end regions 9t of the inner face 9 of the segment 8 where the blade is subject to large bending moment when it is removed from the molded tread rubber. Preferably, the circumferentially end region 9t of the inner face 9 has a circumferential length of 5% of the tread width TW from the circumferential end 8e of the inner face 9 of the segment 8. In order to effectively obtain the advantage above, at least one second blade 15B is preferably arranged in both circumferentially end regions 9t of the inner face 9 of the segment 8.

In order to maintain the rigidity of blades, the first blade 15A preferably has a thickness in a range of not less than 0.2 mm.

When the second blade 15B has a larger thickness, the rigidity of a part of the tread portion 2 which was molded at the circumferential end regions 9t of the inner face 9 is liable to be weakened, whereby uneven wear is liable to occur thereto, and snowy and icy road performance may be deteriorated. From this point of view, the second blade 15B preferably has the thickness in a range of not more than 0.5 mm.

Figure 7:
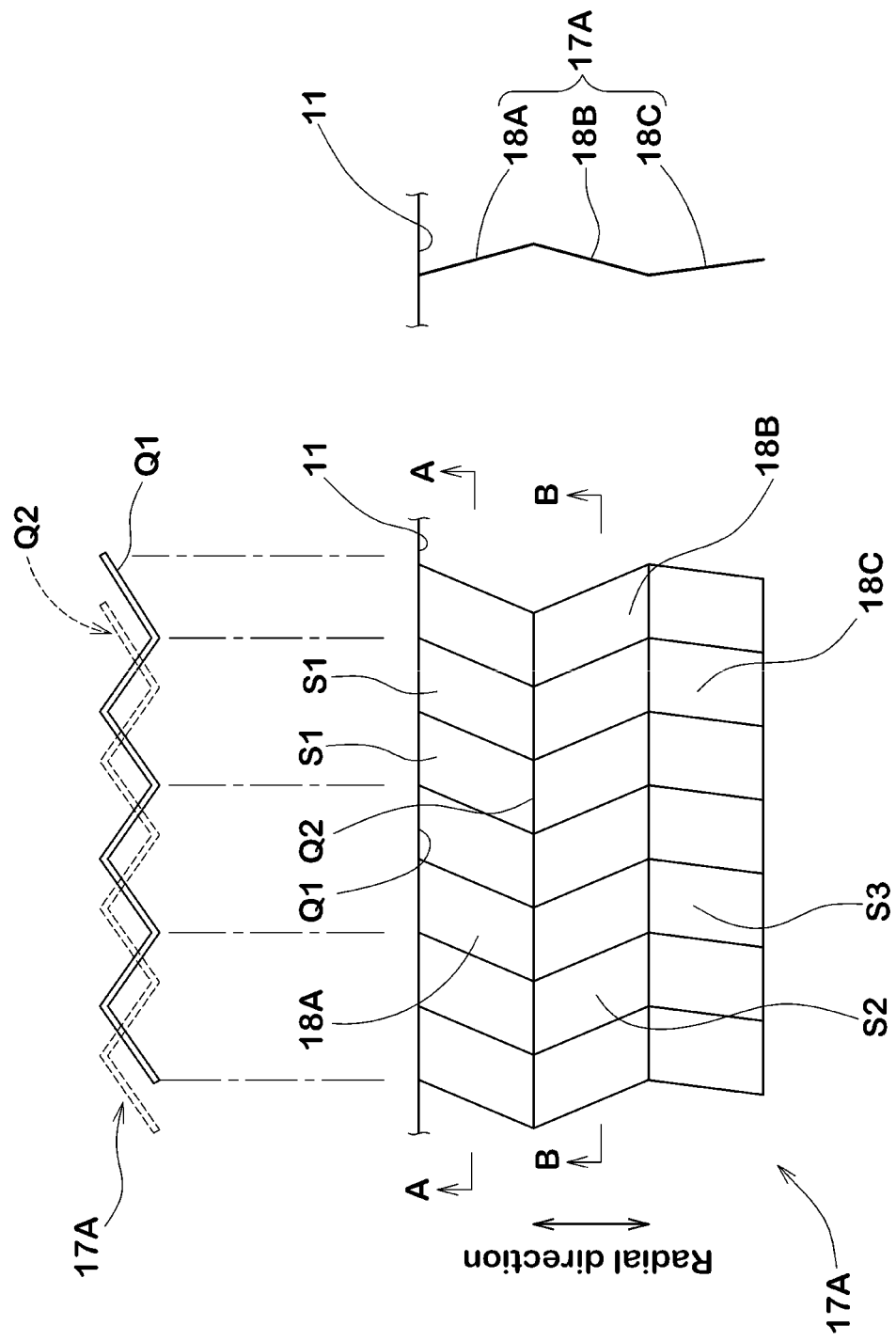
FIG. 7 is a three orthographic view of a three dimensional blade showing an embodiment of the present invention.

Referring to FIG. 7, the three dimensional blades 15 include at least one Miura-fold (Miura-Ori) blade 17A which comprises a primary portion 18A and a secondary portion 18B disposed radially inwardly or outwardly of the primary portion 18A. The primary portion 18A extends from the base face 11 of the inner face 9, and comprises a plurality of adjacent parallelogram elements S1 which are connected in a first zigzag manner in the longitudinal direction of the blade. The secondary portion 18B comprises a plurality of adjacent parallelogram elements S2 which are connected in a second zigzag manner in the longitudinal direction of the blade which differ from the first zigzag manner of the primary portion 18A. Since such a Miura-fold blade 17A has high bending rigidity, a bending of the blade or falling off from the segment 8 may be effectively prevented.

In this embodiment, the Miura-fold blade 17A further comprises a tertiary portion 18C disposed radially inwardly of the secondary portion 18B. The tertiary portion 18C comprises a plurality of adjacent parallelogram elements s3 connected in a third zigzag manner in the longitudinal direction of the blade which differs from the second zigzag manner of the secondary portion 18B. Additionally, the Miura-fold blade 17A also extends in a zigzag manner in a radial direction of the tire such that radially successive parallelogram elements S1, S2, S3 are alternately inclined in the opposite direction shown in FIG. 7. Here, the solid lines in a plan view of FIG. 7 show a profile of radially outermost end Q1 of the primary portion 18A. The dot lines in the plan view of FIG. 7 show a profile of radially outmost end Q2 of the secondary portion 18B.

Figure 8:
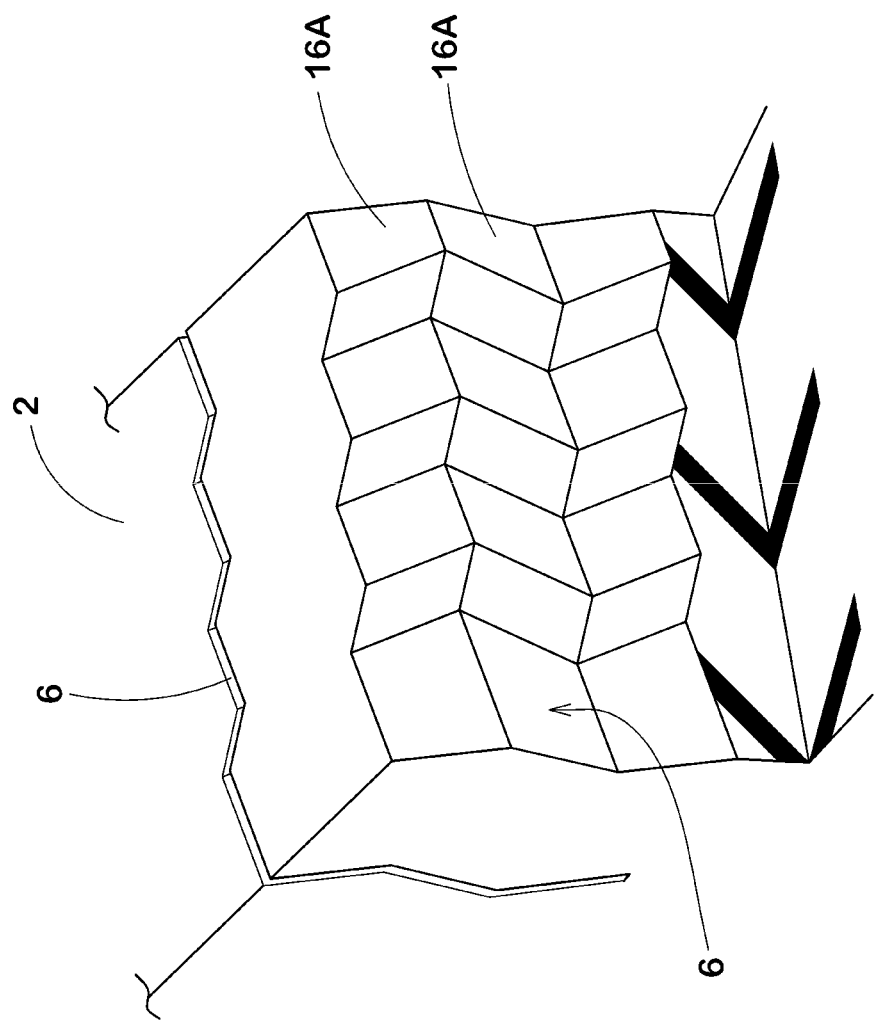
FIG. 8 is a perceptive view of a sipe face molded using the three dimensional blade.

FIG. 8 shows the sipe 6 molded on the Miura-fold blade 17A. Referring to FIG. 8, the sipe 6 helps to prevent large deformation of the tread portion 2 by offering a firmly engagement of two opposed sipe faces 16A, whereby the tread portion 2 maintains a sufficiently ground contact area and delivers high friction force against the road due to biting edges of sipes 6.

FIG. 9A is a cross sectional view of the blade taken along a line A-A of FIG. 7, and FIG. 9B is a cross sectional view of the blade taken along a line B-B of FIG. 7. Referring to FIGS. 9A and 9B, the primary portion 18A of the Miura-fold blade 17A has a zigzag amplitude V1, and the secondary portion 18B has a zigzag amplitude V2. Preferably, a ratio V1/V2 is in a range of from 0.80 to 1.20 in order to prevent a bend or falling off the blade 17A from the segment 8 when the tire is removed from the mold by offering well balanced rigidity between the primary and secondary portions 18A, 18B. In order to further improve the advantage described above, the zigzag amplitude V1 of the first zigzag manner (the primary portion 18A) is the same as the zigzag amplitude V2 of the second zigzag manner (the secondary portion 18B). Here, a zigzag amplitude, in this specification and claims, means a zigzag amplitude of a centerline of the blade in a cross section at radially center portion shown in FIGS. 7, 9A and 9B.

Referring to FIG. 4, the three dimensional blades 15 preferably extend with an inclination at an angle θ1 in a range of not more than 25 degrees with respect to the axial direction of the tire. It helps to reduce resistance force that is generated when the tire 1 is released from the segment 8, whereby damage such as a bend of blade or falling off from the segment 8 may be prevented, especially at the circumferentially end regions 9t. Additionally, the segment 8 may have a high density area of blades 14 due to its small angle θ1 so that the tire tread surface has sipes with high density. When the angle θ1 of the blade 15 is too small, the blade 15 may mold a sipe 6 having a short edge component in the circumferential direction of the tire that does not improve cornering performance on snowy or icy road. Preferably, the angle θ1 of the blade 15 is in a range of from not less than 3 degrees. Here, the angle θ1 is an angle of the zigzag centerline CL that is obtained at the radially outer end Q1 (shown in FIG. 7) of the primary portion 18A, with respect to the axial direction of the tire.

As for the zigzag configuration in the longitudinal direction of blades 14, a sine-wave shape may be employed in place of the polygonal line of this embodiment.

In each segment 8 of one aspect of the present invention, the number of blades 14 in the inboard shoulder region Si is larger than the number of blades 14 in the outboard shoulder region "So". Therefore, since the tire 1 molded on the segment 8 has sufficiently edges of sipes on its inboard shoulder region Si, high traction and braking performance on icy road is obtained under negative camber situation. In this embodiment, six blades 14 are provided in each between adjacent inboard lateral ribs 13A, 13A in the inboard shoulder region Si, and five blades 14 are provided in each between adjacent outboard lateral ribs 13E, 13E in the outboard shoulder region "So". Preferably, arrangement pitches P1 of blades 14 in the inboard shoulder region si are in a range of from 3.0 to 8.0 mm. Preferably, arrangement pitches P2 of blades 14 in the outboard shoulder region "So" are in a range of from 3.5 to 9.0 mm.

Preferably, each circumferentially end 8e of the inner face 9 of the segment 8 traverses between the laterally extending rib 13 and the blade 14 in the inboard shoulder region Si. Additionally, each circumferentially end 8e of the inner face 9 traverses between the blades 14, 14 in the outboard shoulder region "So". The circumferentially end 8e corresponds to the end face 10 of each segment 8. Thus, since the blade 14 tends to arranged away from the circumferentially end 8e of the segment 8 in the inboard shoulder region Si that has many blades compared to the outboard shoulder region "So", damage such as a bending or falling off the blade 14 from the inner face 9 may be prevented, whereby improves the durability of the tire vulcanization mold.

Figure 10A:
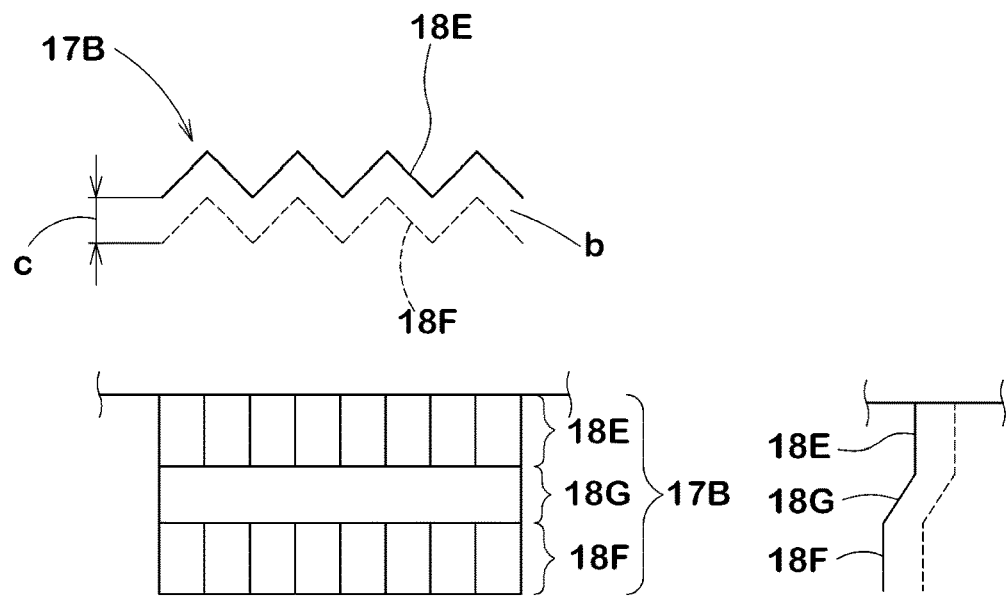
FIG. 10A is a three orthographic view of a three dimensional blade showing another embodiment of the present invention.

FIG. 10A is a three orthographic view of the three dimensional blade 17B showing another embodiment of the present invention. Referring to FIG. 10A, the three dimensional blade 17B comprises a radially outer zigzag portion 18E, a radially inner zigzag portion 18F and a inclined portion 18G connecting between the inner and outer zigzag portions 18E, 18F. This three dimensional blade 17B has a displacement "c" in a direction perpendicular to the longitudinal direction of the blade 17B.

Figure 10B:
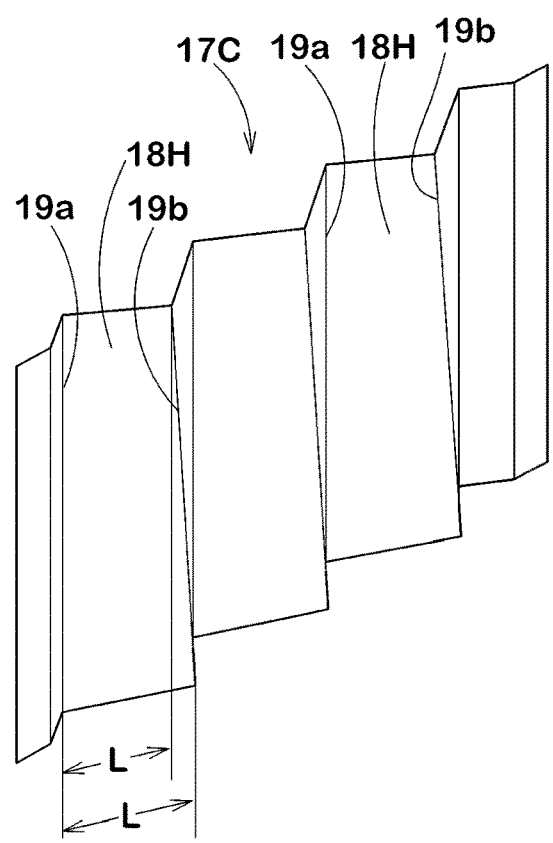
FIG. 10B is a three orthographic view of a three dimensional blade showing still further another embodiment of the present invention.

FIG. 10B is a three orthographic view of the three dimensional blade 17C showing still another embodiment of the present invention. Referring to FIG. 10B, the three dimensional blade 17C extends in a zigzag manner in the longitudinal direction of the blade while changing the zigzag shape along the radial direction of the tire. In this embodiment, radially extending zigzag ridges 19a, 19b are not parallel with each other such that a longitudinal distance L between adjoining ridges 19a, 19b changes in the radial direction of the tire.

The tire vulcanization mold is used for manufacturing a tire. A method for manufacturing tire, in this embodiment as shown in FIG. 2, which comprises a step of preparing a green tire 1A, and vulcanizing of the green tire 1A using the tire vulcanization mold K described above.

The green tire 1A, for example, is prepared according to well known conventional manner. In the vulcanization step, after setting the green tire 1A into an internal cavity H of the mold K, a bladder 20 is inflated with a heated gas or liquid in the tire cavity of the green tire 1A so that the green tire 1A is pressed onto the inner face 9 of the ring shaped tread mold 1R. In the vulcanization step, the tread portion 2 of the green tire 1A is vulcanized and molded its tread pattern based on the tread molding face of the ring shaped tread mold R1. Thus, the tire 1 with sipes is manufactured.

As in the foregoing, a preferred embodiment of the present invention is described above. However, the present invention is not limited to the illustrated embodiment, and can be modified and carried out in various manners.

Comparative Test:

In order to confirm the advantage of the present invention, pneumatic tires were manufactured using tire vulcanization molds having segments with a basic structure shown in FIGS. 4 to 5, and then durability of blades of each mold was tested. Running performance on icy, snowy wet and dry roads of each molded tire was also evaluated.

Each tire vulcanization mold has the same specification as follows except for the details shown in Table 1.

Blade Specification
    Material: SUS304 3/4H
    Configuration: Miura-fold
    Height for molding sipe: 7 mm
    Arrangement pitches P1 in inboard shoulder region: 4.3 mm Tire Specification
    Size: 195/65R15
    Tread width: 165 mm
    Test methods are as follows.

Icy Road Performance Test:
    The test tires were mounted on wheel rims of 6.5×15 with an inner pressure of 200 kPa and installed in a vehicle (FF car with a displacement of 2,000 cc). A test driver drove the vehicle on icy road in the temperature of minus ten degrees C. Then, the braking distance that the vehicle traveled from the point where its brakes were fully applied so that tires were locked up from a traveling speed of 20 km/hr to when it came to complete stop was measured. The results are evaluated using the reciprocal of the braking distance which is indicated in Table 1 by an index based on Ref. 1 being 100. The larger the value, the better the performance is.

Snowy Road Performance Test:

The test vehicle above was run on snowy road covered with compacted and fresh snow, and then the braking distance that the vehicle traveled from the point where its brakes were fully applied with ABS from a traveling speed of 50 km/hr. The results are evaluated using the reciprocal of the braking distance which is indicated in Table 1 by an index based on Ref. 1 being 100. The larger the value, the better the performance is.

Wet Road Performance Test:

The test vehicle described above was entered into a straight course with a water puddle 2.5 mm deep and 200 m long, and then the braking distance that the vehicle traveled from the point where its brakes were fully applied with ABS from a traveling speed of 100 km/hr. The results are evaluated using the reciprocal of the braking distance which is indicated in Table 1 by an index based on Ref. 1 being 100. The larger the value, the better the performance is.

Dry Road Performance Test:

The test vehicle above was drove by a driver on a dry asphalt road and was evaluated steering stability of tires by the driver's feeling. The results are indicated in Table 1 by scores based on Ref. 1 being 100, wherein the larger the value, the better the performance is.

Durability of Blades Test:

The number of vulcanization times up to when damage such as a bending or falling off the blade had occurred was measured on each mold. The results are shown in Table 1 by an index based on Ref. 1 being 100. The larger the value, the better the performance is.

As the test result shown in Table 1, it has been confirmed that example tire vulcanization molds according to the present invention have high durability of blades compared to Referenced molds while manufacturing high performance tires. Additionally, it has been confirmed the advantage above of the present invention under the different tire sizes and tread patterns.

The invention claimed is:

1. A tire vulcanization mold comprising
a ring shaped tread mold for molding a tread pattern of a tire to be molded, said ring shaped tread mold comprising a plurality of segments,
said each segment having a radially inner face and a pair of end faces each of which extends from a circumferential end of the inner face toward radially outwardly of the tire, said segments being arranged in a circumferential direction of the tire so as to have a substantially continuous tread molding face by connecting inner faces one another,
said each inner face of the segment comprising at least one circumferentially extending rib for molding a circumferential groove of the tread pattern, at least one laterally extending rib for molding a lateral groove of the tread pattern, and a plurality of blades for molding sipes of the tread pattern, wherein the blades are arranged in the tire circumferential direction to form a row of blades,
said each inner face of the segment consisting of a pair of segment inner face circumferentially end regions each having a circumferential length of 5% of a tread width of the tread pattern from each circumferential end of the inner face of the segment, and a segment inner face circumferentially middle region between the pair of segment inner face circumferentially end regions,
in the row of blades, said blades including a plurality of three dimensional blades which longitudinally extend in a zigzag manner, said three dimensional blades comprising a plurality of first blades arranged consecutively in the circumferential direction of the tire and each having a thickness in a range of from not more than 0.3 mm and at least one second blade having a thickness in a range of from 0.4 to 0.6 mm, and
the segment inner face circumferentially middle region being provided with only the plurality of first blades and the pair of segment inner face circumferentially end regions being provided with only the at least one second blade.

2. The tire vulcanization mold according to claim 1, wherein

TABLE 1

| | Ref. 1 | Ref. 2 | Ex. 1 | Ex. 2 | Ex. 3 | Ref. 3 |
|---|---|---|---|---|---|---|
| First blade thickness (mm) | 0.4 | 0.4 | 0.3 | 0.3 | 0.3 | 0.3 |
| Second blade thickness (mm) | 0.3 | 0.4 | 0.4 | 0.5 | 0.6 | 0.7 |
| Blade angle θ1 (deg.) | 15 | 15 | 15 | 15 | 15 | 15 |
| Pitches P2 of blades in outboard shoulder region (mm) | 5 | 5 | 5 | 5 | 5 | 5 |
| Icy road performance (Index) | 100 | 98 | 107 | 106 | 104 | 99 |
| Snowy road performance (Index) | 100 | 99 | 104 | 104 | 103 | 99 |
| Wet road performance (Index) | 100 | 97 | 105 | 104 | 103 | 99 |
| Dry road performance (Score) | 100 | 97 | 108 | 108 | 106 | 96 |
| Durability of blades (Index) | 100 | 115 | 114 | 125 | 130 | 134 |

| | Ex. 4 | Ex. 5 | Ex. 6 | Ex. 7 | Ex. 8 | Ex. 9 | Ex. 10 |
|---|---|---|---|---|---|---|---|
| First blade thickness (mm) | 0.3 | 0.3 | 0.3 | 0.3 | 0.3 | 0.3 | 0.3 |
| Second blade thickness (mm) | 0.5 | 0.5 | 0.5 | 0.5 | 0.5 | 0.5 | 0.5 |
| Blade angle θ1 (deg.) | 0 | 25 | 30 | 15 | 15 | 15 | 15 |
| Pitches P2 of blades in outboard shoulder region (mm) | 5 | 5 | 5 | 3 | 4.5 | 9 | 10 |
| Icy road performance (Index) | 105 | 105 | 105 | 107 | 106 | 103 | 101 |
| Snowy road performance (Index) | 102 | 104 | 102 | 104 | 104 | 101 | 100 |
| Wet road performance (Index) | 102 | 103 | 103 | 103 | 103 | 103 | 101 |
| Dry road performance (Score) | 102 | 106 | 106 | 100 | 106 | 108 | 109 |
| Durability of blades (Index) | 130 | 125 | 120 | 120 | 120 | 120 | 122 | said three dimensional blades comprise a primary portion and a secondary portion disposed radially inwardly or outwardly of the primary portion, the primary portion comprises a plurality of adjacent parallelogram elements which are connected in a first zigzag manner in the longitudinal direction of the blade, the secondary portion comprises a plurality of adjacent parallelogram elements which are connected in a second zigzag manner in the longitudinal direction of the blade which differs from the first zigzag manner, and a zigzag amplitude of the first zigzag manner is the same as a zigzag amplitude of the second zigzag manner.

3. The tire vulcanization mold according to claim 1, wherein said tread pattern has a designated install direction to a vehicle so as to have an outboard tread edge and an inboard tread edge, said at least one circumferentially extending rib comprises an inboard circumferential rib arranged the nearest of the inboard tread edge and an outboard circumferential rib arranged the nearest of the outboard tread edge, said inboard circumferential rib and the outboard circumferential rib are non-symmetrically arranged with respect to a tire equator, said substantially continuous tread molding face includes an inboard shoulder region which is an axially outside region than the inboard circumferential rib and an outboard shoulder region which is an axially outside region than the outboard circumferential rib, said each circumferentially end region of the inner face of the segment traverses between the laterally extending rib and the blade in the inboard shoulder region, said each circumferentially end of the inner face of the segment traverses between the blades in the outboard shoulder region, and the number of blades in the inboard shoulder region is larger than the number of blades in the outboard shoulder region.

4. A method for manufacturing a tire comprising a step of vulcanizing of a tire using the tire vulcanization mold according to claim 1.

* * * * *